(12) United States Patent
Yuan et al.

(10) Patent No.: US 11,059,211 B2
(45) Date of Patent: Jul. 13, 2021

(54) INJECTION MOLDING CONTROL METHOD

(71) Applicant: DELTA ELECTRONICS, INC., Taoyuan (TW)

(72) Inventors: Te-Wei Yuan, Taoyuan (TW); Tun-Jung Li, Taoyuan (TW); Yuan-Hung Cho, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/691,630

(22) Filed: Nov. 22, 2019

(65) Prior Publication Data

US 2020/0086543 A1 Mar. 19, 2020

Related U.S. Application Data

(62) Division of application No. 15/218,073, filed on Jul. 24, 2016, now Pat. No. 10,518,454.

(30) Foreign Application Priority Data

Mar. 4, 2016 (TW) ................. 105106629

(51) Int. Cl.
*B29C 45/77* (2006.01)
*B29C 45/80* (2006.01)
*B29C 45/03* (2006.01)

(52) U.S. Cl.
CPC .............. *B29C 45/77* (2013.01); *B29C 45/03* (2013.01); *B29C 45/80* (2013.01); *B29C 2945/76006* (2013.01); *B29C 2945/7612* (2013.01); *B29C 2945/76083* (2013.01); *B29C 2945/76498* (2013.01); *B29C 2945/76545* (2013.01); *B29C 2945/76605* (2013.01)

(58) Field of Classification Search
CPC ......... B29C 45/77; B29C 45/03; B29C 45/80; B29C 2945/76006; B29C 2945/76083; B29C 2945/7612; B29C 2945/76498; B29C 2945/76545; B29C 2945/76605
See application file for complete search history.

(56) References Cited

U.S. PATENT DOCUMENTS

| | | | |
|---|---|---|---|
| 3,911,677 A | 10/1975 | Collins | |
| 3,982,440 A * | 9/1976 | Groleau | B29C 45/77 73/865.8 |
| 4,678,420 A | 7/1987 | Inoue | |
| 4,695,237 A | 9/1987 | Inaba | |
| 5,052,909 A | 10/1991 | Hertzer et al. | |

(Continued)

FOREIGN PATENT DOCUMENTS

| CN | 202528404 U | 11/2012 |
|---|---|---|
| CN | 102001167 B | 7/2013 |

(Continued)

*Primary Examiner* — Xiao S Zhao
*Assistant Examiner* — Emmanuel S Luk
(74) *Attorney, Agent, or Firm* — CKC & Partners Co., LLC

(57) ABSTRACT

The present invention discloses an injection molding control method. The injection molding control method comprises the following steps: establishing a work command according to a plurality of production process parameters; receiving a position information directly from an injection molding machine; and controlling a servo pump to drive the injection molding machine according to the position information and the work command.

4 Claims, 2 Drawing Sheets

(56) References Cited

U.S. PATENT DOCUMENTS

| | | | |
|---|---|---|---|
| 5,062,785 A | 11/1991 | Stroud, III et al. | |
| 5,182,716 A | 1/1993 | Stroud, III et al. | |
| 5,258,918 A | 11/1993 | Giancola | |
| 5,316,707 A | 5/1994 | Stanciu et al. | |
| 5,906,778 A | 5/1999 | Arai et al. | |
| 5,968,439 A | 10/1999 | Grove | |
| 5,995,009 A | 11/1999 | Yonezawa et al. | |
| 5,997,778 A | 12/1999 | Bulgrin | |
| 6,289,259 B1 * | 9/2001 | Choi | B23K 3/0623 |
| | | | 425/145 |
| 6,340,439 B1 | 1/2002 | Hiraoka | |
| 6,371,748 B1 | 4/2002 | Hara | |
| 6,379,119 B1 | 4/2002 | Truninger | |
| 6,645,417 B1 | 11/2003 | Grove | |
| 2002/0022066 A1 * | 2/2002 | Matsubayashi | B29C 45/77 |
| | | | 425/145 |
| 2002/0026264 A1 | 2/2002 | Choi | |
| 2003/0160345 A1 | 8/2003 | Liu et al. | |
| 2004/0140579 A1 | 7/2004 | Uwaji et al. | |
| 2005/0129794 A1 | 6/2005 | Chao et al. | |
| 2009/0108498 A1 | 4/2009 | Ujma | |
| 2011/0208362 A1 | 8/2011 | Alstrin et al. | |
| 2011/0285046 A1 * | 11/2011 | Koike | B29C 45/80 |
| | | | 264/40.5 |
| 2014/0035563 A1 * | 2/2014 | Tan | B29C 45/2806 |
| | | | 324/207.2 |
| 2014/0183771 A1 | 7/2014 | Ikarashi et al. | |
| 2016/0332351 A1 | 11/2016 | Oono | |
| 2017/0232651 A1 * | 8/2017 | Ota | B29C 45/7646 |
| | | | 425/145 |
| 2017/0252957 A1 * | 9/2017 | Yuan | B29C 45/77 |
| 2019/0155247 A1 * | 5/2019 | Sato | B29C 45/64 |

FOREIGN PATENT DOCUMENTS

| | | |
|---|---|---|
| TW | I260264 B | 8/2006 |
| TW | M423041 U1 | 2/2012 |

* cited by examiner

INJECTION MOLDING CONTROL METHOD

RELATED APPLICATIONS

The present application is a Divisional Application of the U.S. application Ser. No. 15/218,073, filed Jul. 24, 2016, which claims priority to Taiwan Application Serial Number 105106629, filed Mar. 4, 2016, all of which are herein incorporated by reference in their entireties.

BACKGROUND

Field of Invention

The present invention relates to an injection molding control method.

Description of Related Art

A host controller controls the operation process of an injection molding machine and outputs single-motion control commands to a driver. In accordance with the control commands, the driver directs a servo pump to drive a hydraulic-cylinder and operate injection molding procedures. Due to the operation of the injection molding machine having a response delay time, the control commands cannot keep up with real-time variations. This causes issues such as: the provided actual pressure being greater than the required pressure; insufficient material provisions; and unsmooth product surfaces. The resulting defective rate of the products is therefore higher.

SUMMARY

Embodiments of the present invention described herein provide a control system and control method for injection molding and an injection molding machine. The control commands outputted by a host controller include work commands with a plurality of continuous motions. The work command defines a required pressure, a required flow, and a position information of the hydraulic-cylinder of each motion of the injection molding machine. Embodiments of the injection molding control system of the present invention establish the work command in the driver to perform calculations in advance. The driver controls the operation parameters of the servo pump according to the position of the hydraulic-cylinder, provided by a hydraulic-cylinder position measurement module.

According to an aspect of the present disclosure, an injection molding control method is provided, the method comprising the following steps: establishing a work command according to a plurality of production process parameters and providing the work command to a driver of an injection molding machine; the driver receiving a position information directly from the injection molding machine; and the driver controlling a servo pump to drive the injection molding machine according to the position information and the work command.

In one embodiment of the present invention, the method further comprises the following steps: controlling a motor's torque and rotating speed according to the work command and the position information; and controlling an output pressure and an output flow of a hydraulic-pump generated according to the motor's torque and rotating speed.

In one embodiment of the present invention, the method further comprises the following steps: detecting the motor's torque and rotating speed in real-time; and detecting the output pressure and the output flow of the hydraulic-pump in real-time.

DETAILED DESCRIPTION

The invention can be more fully understood by reading the following detailed description of embodiments, with reference to the accompanying drawings.

The present invention provides a method for an injection molding machine, which establishes work commands in a driver to perform calculations in advance. Further, the driver controls the operation parameters of a servo pump according to the positions of the hydraulic-cylinder, the position information being provided by a hydraulic-cylinder position measurement module.

Figure 1:
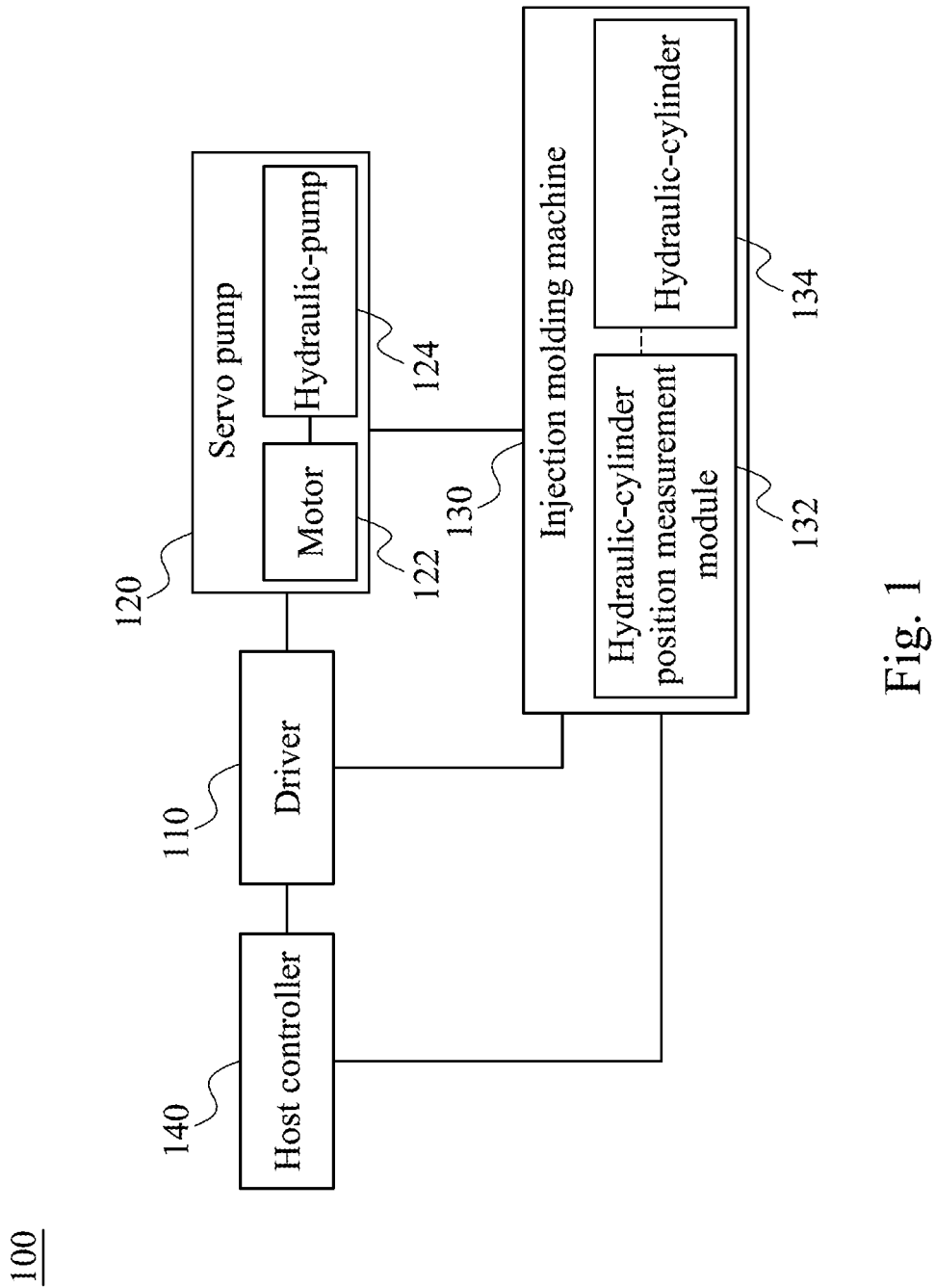
FIG. 1 is a block diagram of an injection molding control system according to an embodiment of the present invention.

According to an embodiment of the present invention, referring to FIG. 1, an injection molding control system 100 comprises a host controller 140, a driver 110, a servo pump 120, and an injection molding machine 130. The driver 110 is coupled to the servo pump 120, the injection molding machine 130, and the host controller 140. The injection molding machine 130 is coupled to the servo pump 120 and the host controller 140.

The servo pump 120 further comprises a motor 122 and a hydraulic-pump 124 coupled to each other. The injection molding machine 130 comprises a hydraulic-cylinder position measurement module 132 and a hydraulic-cylinder 134. The hydraulic-cylinder position measurement module 132 may be a sensor which detects a location and/or a movement of the hydraulic-cylinder and being capable of providing the location/movement information to indicate hydraulic-cylinder's position (or the injection molding process) of the hydraulic-cylinder 134.

The hydraulic-cylinder position measurement module 132 may provide the hydraulic-cylinder's position information by transmitting directly to the driver 110, or provide the hydraulic-cylinder's position information to the host controller 140.

The host controller 140 can be a mainframe computer system or a personal computer or an electric device with a computation capability. The host controller 140 is coupled to the driver 110, and the host controller 140 establishes the work commands according to a plurality of production process parameters. The work command is a set of instructions that include a plurality of production process motions. The work command indicates a required rotating speed of the motor 122 and a required flow of the hydraulic-pump 124 corresponding to different motions, such as closing the mold, injection, pressure holding, material stirring, cooling, opening the mold, and ejection etc. The work command may be a digital signal which the host controller 140 transmits to a memory of the driver 110 through hardware connections, and the driver 110 controls the motor 122 of the servo pump 120 according to the work command. The motor 122 drives the hydraulic-pump 124, and the hydraulic-pump 124 drives the hydraulic-cylinder 134 of the injection molding machine 130 to perform the injection molding. With a feedback loop provided as shown in FIG. 1, the host controller 140 can detect the injection molding process status/progress of the of the injection molding machine 130 in real-time.

In one operation mode, the host controller 140 establishes the work command according to a plurality of production process parameters. Next, the host controller 140 transmits the work command through hardware connections to a memory of the driver 110 to be stored. In accordance with the work command, the driver 110 controls the motor 122 of the servo pump 120 and the motor 122 drives the hydraulic-pump 124 to operate the hydraulic-cylinder 134 of the injection molding machine 130 to perform the injection molding process.

Figure 2:
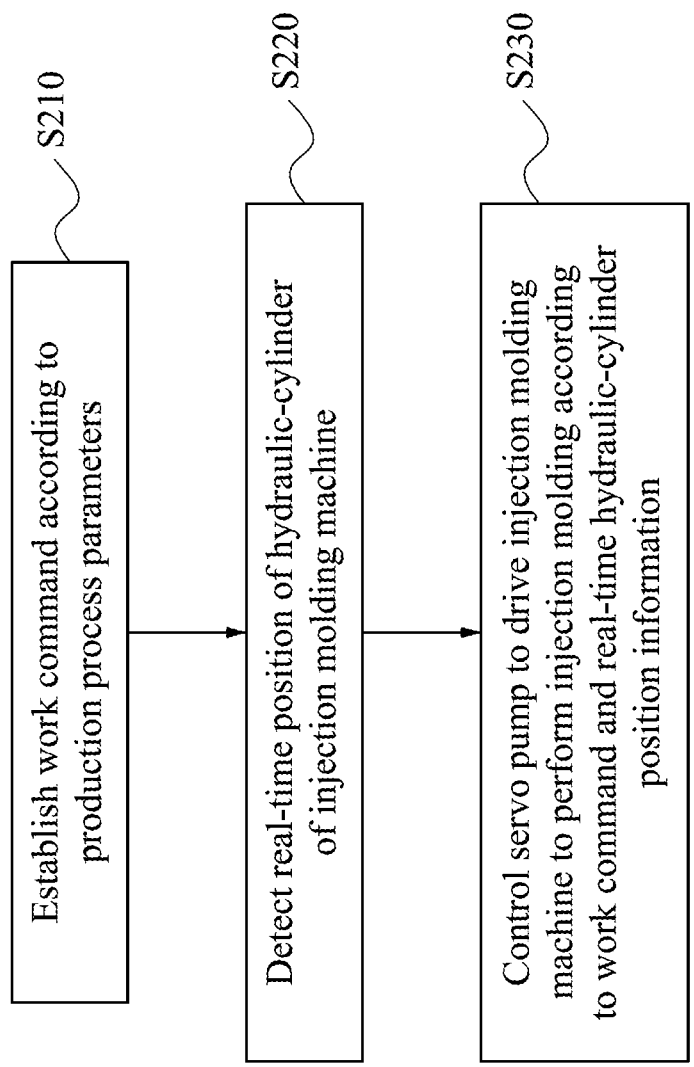
FIG. 2 is a block diagram of an injection molding control method according to an embodiment of the present invention.

However, if the operation is just based on the work command, there may be errors due to mismatch between work command instructions and the actual real-time molding process caused by delays in feedback response from the injection molding machine. According to an embodiment of the present invention, the injection molding control method of the present invention provides a real-time detection and of the injection molding machine 130 and faster feedback response for controlling the performance of the injection molding process. FIG. 2 describes an injection molding control method according to an embodiment of the present invention. Referring to FIG. 1 and FIG. 2, after the initial establishment of work command according to production process parameters (S210), the injection molding machine 130 operates according to the work command, and the driver 110 also detects the real-time position of the hydraulic-cylinder 134 by the hydraulic-cylinder position measurement module 132 (Step S220). The position information can be a location of the hydraulic-cylinder 134, and/or indication a movement or molding progress of the hydraulic-cylinder 134. The real-time position information is provided directly to the driver 110 so as to let the driver 110 know the injection molding status of the injection molding machine 130 at any time. With the faster and more rapid response feedback, the driver 110 then controls the servo pump 120 to operate the injection molding machine 130 to perform injection molding according to the work command and the real-time position of the hydraulic-cylinder position measurement module 132 (Step S230).

At Step S230, the servo pump 120 drives the injection molding machine 130 to perform injection molding, wherein the servo pump 120 includes the motor 122 and the hydraulic-pump 124. The driver 110 controls a torque and a rotating speed of the motor 122 according to the work command and the real-time position of the hydraulic-cylinder position measurement module 132. The motor 122 controls an output pressure and an output flow of the hydraulic-pump 124 according to the motor's torque and the rotating speed, and the output pressure of the hydraulic-pump 124 drives the hydraulic-cylinder 134 of the injection molding machine 130 to perform the injection molding.

According to an embodiment of the present invention, the driver 110 detects the torque and the rotating speed of the motor 122 in real-time, and also detects the output pressure and the output flow of the hydraulic-pump 124 in real-time. Through real-time detection, the driver 110 can detect the actual torque and actual rotating speed of the motor 122, and the actual output pressure and actual output flow of the hydraulic-pump 124. Therefore, the driver 110 can know in real-time if an error has occurred with the injection molding process.

Embodiments of the present invention described herein provides a control system and control method for injection molding machine. The control commands outputted by the host controller include work commands with a plurality of production process motions. The work command defines the required pressure, the required flow, and the position information of the hydraulic-cylinder of each motion of the injection molding machine. The injection molding control system of the present invention establishes the work command in the driver to perform calculations in advance. The driver controls the operation parameters of the servo pump according to the position of the hydraulic-cylinder position measurement module. In the injection molding control system of the embodiment/s of the present invention, the driver obtains the complete work command in advance so as to reduce the response time. Further, the feedback operation of the hydraulic-cylinder position measurement module directly to the driver reduces control error, so that the pressure control and the flow control can be more accurate and faster. This could lead to improvements to the yield rate of products and reduce the manufacturing cost. That is, the work command is stored in the driver and the work command can be calculated in an inner control loop without having to go through the host controller, and so may improve calculation efficiency and control response.

It will be apparent to those skilled in the art that modifications and variations can be made to the embodiments of the present invention without departing from the scope or spirit of the invention. In view of the foregoing, it is intended that the present invention cover modifications and variations of this invention provided they fall within the scope of the following claims.

What is claimed is:

1. An injection molding control method, comprising:
    establishing a work command by a host controller, wherein the work command is a set of instructions that include a plurality of production process motions, and indicates a required rotating speed of a motor and a required flow of a hydraulic-pump of a servo pump corresponding to a plurality of motions;
    providing the work command to a memory of a driver of an injection molding machine through hardware connections by the host controller;
    the driver receiving a position information directly from the injection molding machine; and
    the driver controlling the servo pump to drive the injection molding machine according to the position information and the work command.

2. The injection molding control method of claim 1, further comprising:
    controlling a motor's torque and rotating speed according to the work command and the position information; and
    controlling an output pressure and an output flow of the hydraulic-pump generated according to the motor's torque and rotating speed.

3. The injection molding control method of claim 2, further comprising:
    detecting the motor's torque and rotating speed in real-time; and
    detecting the output pressure and the output flow of the hydraulic-pump in real-time.

4. The injection molding control method of claim 2, further comprising:
    detecting the motor's torque and rotating speed in real-time to obtain an actual torque and an actual rotating speed of the motor;
    detecting an output pressure and an output flow of the hydraulic-pump in real-time to obtain an actual output pressure and an actual output flow of the hydraulic-pump; and determining in real-time if an error has occurred according to the actual torque and the actual rotating speed of the motor, and the actual output pressure and the actual output flow of the hydraulic-pump.

\* \* \* \* \*